US012618976B2

(12) United States Patent
Shen

(10) Patent No.: US 12,618,976 B2
(45) Date of Patent: **\*May 5, 2026**

(54) ANNOTATION CROSS-LABELING FOR AUTONOMOUS CONTROL SYSTEMS

(71) Applicant: Tesla, Inc., Austin, TX (US)

(72) Inventor: Anting Shen, Berkeley, CA (US)

(73) Assignee: Tesla, Inc., Austin, TX (US)

( \* ) Notice: Subject to any disclaimer, the term of this patent is extended or adjusted under 35 U.S.C. 154(b) by 214 days.

This patent is subject to a terminal disclaimer.

(21) Appl. No.: 18/534,443

(22) Filed: Dec. 8, 2023

(65) Prior Publication Data

US 2024/0125934 A1 Apr. 18, 2024

Related U.S. Application Data

(63) Continuation of application No. 17/806,358, filed on Jun. 10, 2022, now Pat. No. 11,841,434, which is a
(Continued)

(51) Int. Cl.
*G06T 7/521* (2017.01)
*G01S 17/00* (2020.01)
(Continued)

(52) U.S. Cl.
CPC .............. *G01S 17/86* (2020.01); *G01S 17/00* (2013.01); *G01S 17/89* (2013.01); *G01S 17/894* (2020.01);
(Continued)

(58) Field of Classification Search
CPC ........ G01S 17/86; G01S 17/894; G01S 17/89; G06T 7/521; G06V 10/809; G06V 20/10;
(Continued)

(56) References Cited

U.S. PATENT DOCUMENTS 6,882,755 B2 4/2005 Silverstein et al.
7,209,031 B2 4/2007 Nakai et al.
(Continued)

FOREIGN PATENT DOCUMENTS

AU 2019261735 A1 5/2016
AU 2019201716 A1 10/2020
(Continued)

OTHER PUBLICATIONS

Lertniphonphan, Kanokphan, et al. "2D to 3D label propagation for object detection in point cloud." 2018 IEEE International Conference on Multimedia & Expo Workshops (ICMEW). IEEE, 2018. (Year: 2018).\*
(Continued)

*Primary Examiner* — Jonathan S Lee
(74) *Attorney, Agent, or Firm* — Foley & Lardner LLP

(57) ABSTRACT

An annotation system uses annotations for a first set of sensor measurements from a first sensor to identify annotations for a second set of sensor measurements from a second sensor. The annotation system identifies reference annotations in the first set of sensor measurements that indicates a location of a characteristic object in the two-dimensional space. The annotation system determines a spatial region in the three-dimensional space of the second set of sensor measurements that corresponds to a portion of the scene represented in the annotation of the first set of sensor measurements. The annotation system determines annotations within the spatial region of the second set of sensor measurements that indicates a location of the characteristic object in the three-dimensional space.

20 Claims, 4 Drawing Sheets

Related U.S. Application Data continuation of application No. 16/514,721, filed on Jul. 17, 2019, now Pat. No. 11,361,457.

(60) Provisional application No. 62/701,441, filed on Jul. 20, 2018.

(51) Int. Cl.

| | |
|---|---|
| G01S 17/86 | (2020.01) |
| G01S 17/89 | (2020.01) |
| G01S 17/894 | (2020.01) |
| G06V 10/776 | (2022.01) |
| G06V 10/80 | (2022.01) |
| G06V 20/10 | (2022.01) |
| G06V 20/56 | (2022.01) |
| B60W 60/00 | (2020.01) |

(52) U.S. Cl.
CPC ............ *G06T 7/521* (2017.01); *G06V 10/776* (2022.01); *G06V 10/809* (2022.01); *G06V 20/10* (2022.01); *G06V 20/56* (2022.01); *B60W 60/001* (2020.02); *B60W 2420/403* (2013.01); *B60W 2420/408* (2024.01)

(58) Field of Classification Search
CPC ... G06V 10/776; G06V 20/56; B60W 60/001; B60W 2420/52; G60W 2420/42
USPC ........................................................ 382/154
See application file for complete search history.

(56) References Cited

U.S. PATENT DOCUMENTS

| | | |
|---|---|---|
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle |
| 8,509,478 B2 | 8/2013 | Haas et al. |
| 8,588,470 B2 | 11/2013 | Rodriguez Serrano et al. |
| 8,744,174 B2 | 6/2014 | Hamada et al. |
| 8,773,498 B2 | 7/2014 | Lindbergh |
| 8,912,476 B2 | 12/2014 | Fogg |
| 8,913,830 B2 | 12/2014 | Sun et al. |
| 8,928,753 B2 | 1/2015 | Han et al. |
| 8,972,095 B2 | 3/2015 | Furuno |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | Mccarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks |
| 10,242,293 B2 | 3/2019 | Shim |
| 10,248,121 B2 | 4/2019 | Vandenberg |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel |
| 10,310,087 B2 | 6/2019 | Laddha et al. |
| 10,311,312 B2 | 6/2019 | Yu |
| 10,318,848 B2 | 6/2019 | Dijkman et al. |
| 10,325,178 B1 | 6/2019 | Tang |
| 10,331,974 B2 | 6/2019 | Zia et al. |
| 10,338,600 B2 | 7/2019 | Yoon et al. |
| 10,343,607 B2 | 7/2019 | Kumon |
| 10,359,783 B2 | 7/2019 | Williams et al. |
| 10,366,290 B2 | 7/2019 | Wang |
| 10,372,130 B1 | 8/2019 | Kaushansky et al. |
| 10,373,019 B2 | 8/2019 | Nariyambut Murali et al. |
| 10,373,026 B1 | 8/2019 | Kim |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp |
| 10,423,934 B1 | 9/2019 | Zanghi et al. |
| 10,436,615 B2 | 10/2019 | Agarwal et al. |
| 10,452,905 B2 | 10/2019 | Segalovitz |
| 10,460,053 B2 | 10/2019 | Olson et al. |
| 10,467,459 B2 | 11/2019 | Chen |
| 10,468,008 B2 | 11/2019 | Beckman et al. |
| 10,468,062 B1 | 11/2019 | Levinson |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | N |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neumann |
| 10,565,475 B2 | 2/2020 | Lecue |
| 10,567,674 B2 | 2/2020 | Kirsch |
| 10,568,570 B1 | 2/2020 | Sherpa |
| 10,572,717 B1 | 2/2020 | Zhu |
| 10,574,905 B2 | 2/2020 | Srikanth et al. |
| 10,579,058 B2 | 3/2020 | Oh |
| 10,579,063 B2 | 3/2020 | Haynes et al. |
| 10,579,897 B2 | 3/2020 | Redmon et al. |
| 10,586,280 B2 | 3/2020 | Mckenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai |
| 10,614,344 B2 | 4/2020 | Anthony et al. |
| 10,621,513 B2 | 4/2020 | Deshpande |
| 10,627,818 B2 | 4/2020 | Sapp et al. |
| 10,628,432 B2 | 4/2020 | Guo |
| 10,628,686 B2 | 4/2020 | Ogale et al. |
| 10,628,688 B1 | 4/2020 | Kim et al. |
| 10,629,080 B2 | 4/2020 | Kazemi |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang |
| 10,656,657 B2 | 5/2020 | Djuric |
| 10,657,391 B2 | 5/2020 | Chen et al. |
| 10,657,418 B2 | 5/2020 | Marder |
| 10,657,934 B1 | 5/2020 | Kolen et al. |
| 10,661,902 B1 | 5/2020 | Tavshikar |
| 10,664,750 B2 | 5/2020 | Greene |

(56) References Cited

U.S. PATENT DOCUMENTS

| | | |
|---|---|---|
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su |
| 10,685,188 B1 | 6/2020 | Zhang et al. |
| 10,692,000 B2 | 6/2020 | Surazhsky |
| 10,692,242 B1 | 6/2020 | Morrison et al. |
| 10,693,740 B2 | 6/2020 | Coccia |
| 10,698,868 B2 | 6/2020 | Guggilla |
| 10,699,119 B2 | 6/2020 | Lo et al. |
| 10,699,140 B2 | 6/2020 | Kench et al. |
| 10,699,477 B2 | 6/2020 | Levinson |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi-Gonzalez et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao |
| 10,769,525 B2 | 9/2020 | Redding et al. |
| 10,776,626 B1 | 9/2020 | Lin et al. |
| 10,776,673 B2 | 9/2020 | Kim |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi-Gonzalez et al. |
| 10,817,732 B2 | 10/2020 | Porter et al. |
| 10,819,923 B1 | 10/2020 | Mccauley |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova |
| 10,832,414 B2 | 11/2020 | Pfeiffer |
| 10,832,418 B1 | 11/2020 | Karasev |
| 10,833,785 B1 | 11/2020 | O'Shea et al. |
| 10,836,379 B2 | 11/2020 | Xiao |
| 10,838,936 B2 | 11/2020 | Cohen |
| 10,839,230 B2 | 11/2020 | Charette et al. |
| 10,839,578 B2 | 11/2020 | Coppersmith, III |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al Shehri et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado Bataller et al. |
| 10,908,068 B2 | 2/2021 | Amer et al. |
| 10,908,606 B2 | 2/2021 | Stein et al. |
| 10,909,368 B2 | 2/2021 | Guo |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,361,457 B2 | 6/2022 | Shen |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0031064 A1 | 2/2007 | Zhao et al. |
| 2008/0225048 A1 | 9/2008 | Bijanikumar et al. |
| 2008/0247635 A1 | 10/2008 | Davis |
| 2009/0016571 A1 | 1/2009 | Tijerina |
| 2010/0118157 A1 | 5/2010 | Ushijima et al. |
| 2012/0109915 A1 | 5/2012 | Kamekawa |
| 2012/0110491 A1 | 5/2012 | Cheung |
| 2012/0128205 A1 | 5/2012 | Lee |
| 2012/0134595 A1 | 5/2012 | Fonseca et al. |
| 2015/0104102 A1 | 4/2015 | Carreira |
| 2016/0132786 A1 | 5/2016 | Balan et al. |
| 2016/0328856 A1 | 11/2016 | Mannino |
| 2017/0011281 A1 | 1/2017 | Dijkman |
| 2017/0158134 A1 | 6/2017 | Shigemura |
| 2017/0206434 A1 | 7/2017 | Nariyambut Murali et al. |
| 2018/0012082 A1 | 1/2018 | Satzoda et al. |
| 2018/0012411 A1 | 1/2018 | Richey et al. |
| 2018/0018590 A1 | 1/2018 | Szeto et al. |
| 2018/0039853 A1 | 2/2018 | Liu |
| 2018/0067489 A1 | 3/2018 | Oder et al. |
| 2018/0068459 A1 | 3/2018 | Zhang |
| 2018/0068540 A1 | 3/2018 | Romanenko et al. |
| 2018/0074506 A1 | 3/2018 | Branson |
| 2018/0121762 A1 | 5/2018 | Han |
| 2018/0129919 A1 | 5/2018 | Tang |

(56) References Cited

U.S. PATENT DOCUMENTS

| 2018/0150081 A1 | 5/2018 | Gross et al. |
| 2018/0211403 A1 | 7/2018 | Hotson et al. |
| 2018/0308012 A1 | 10/2018 | Mummadi |
| 2018/0314878 A1 | 11/2018 | Lee et al. |
| 2018/0357511 A1 | 12/2018 | Misra |
| 2018/0374105 A1 | 12/2018 | Azout et al. |
| 2019/0023277 A1 | 1/2019 | Roger |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Dan et al. |
| 2019/0079526 A1 | 3/2019 | Vallespi-Gonzalez et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min |
| 2019/0130255 A1 | 5/2019 | Yim |
| 2019/0145765 A1 | 5/2019 | Luo et al. |
| 2019/0146497 A1 | 5/2019 | Urtasun |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari Tafti et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon |
| 2019/0286652 A1 | 9/2019 | Habbecke et al. |
| 2019/0286972 A1 | 9/2019 | El Husseini et al. |
| 2019/0287028 A1 | 9/2019 | St. Amant et al. |
| 2019/0289281 A1 | 9/2019 | Badrinarayanan et al. |
| 2019/0294177 A1 | 9/2019 | Kwon |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos, Jr. et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao et al. |
| 2020/0033865 A1 | 1/2020 | Mellinger, III |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu |
| 2020/0051550 A1 | 2/2020 | Baker |
| 2020/0060757 A1 | 2/2020 | Ben-Haim |
| 2020/0065711 A1 | 2/2020 | Clément |
| 2020/0065879 A1 | 2/2020 | Hu |
| 2020/0069973 A1 | 3/2020 | Lou |
| 2020/0073385 A1 | 3/2020 | Jobanputra |
| 2020/0074230 A1 | 3/2020 | England |
| 2020/0086880 A1 | 3/2020 | Poeppel |
| 2020/0089243 A1 | 3/2020 | Poeppel |
| 2020/0089969 A1 | 3/2020 | Lakshmi Narayanan |
| 2020/0090056 A1 | 3/2020 | Singhal |
| 2020/0097841 A1 | 3/2020 | Ioannis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella |
| 2020/0117889 A1 | 4/2020 | Laput |
| 2020/0117916 A1 | 4/2020 | Liu |
| 2020/0117917 A1 | 4/2020 | Yoo |
| 2020/0118035 A1 | 4/2020 | Asawa |
| 2020/0125844 A1 | 4/2020 | She |
| 2020/0125845 A1 | 4/2020 | Hess |
| 2020/0126129 A1 | 4/2020 | Lkhamsuren |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip Leon et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo Abolfathi et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |

(56) References Cited

U.S. PATENT DOCUMENTS

| | | |
|---|---|---|
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | Remine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | Du Toit et al. |
| 2020/0218722 A1 | 7/2020 | Mai et al. |
| 2020/0218979 A1 | 7/2020 | Kwon et al. |
| 2020/0223434 A1 | 7/2020 | Campos Macias et al. |
| 2020/0225758 A1 | 7/2020 | Tang et al. |
| 2020/0226377 A1 | 7/2020 | Campos Macias et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi Mohammadabadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov |
| 2020/0315708 A1 | 10/2020 | Mosnier |
| 2020/0320132 A1 | 10/2020 | Neumann |
| 2020/0324073 A1 | 10/2020 | Rajan Kesavelu Shekar et al. |
| 2020/0327192 A1 | 10/2020 | Hackman et al. |
| 2020/0327443 A1 | 10/2020 | Van Vredendaal et al. |
| 2020/0327449 A1 | 10/2020 | Tiwari et al. |
| 2020/0327662 A1 | 10/2020 | Liu et al. |
| 2020/0327667 A1 | 10/2020 | Arbel |
| 2020/0331476 A1 | 10/2020 | Chen et al. |
| 2020/0334416 A1 | 10/2020 | Vianu et al. |
| 2020/0334495 A1 | 10/2020 | Al-Rfou et al. |
| 2020/0334501 A1 | 10/2020 | Lin et al. |
| 2020/0334551 A1 | 10/2020 | Javidi |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | Mcgavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |

(56)　　　References Cited

U.S. PATENT DOCUMENTS

| | | | |
|---|---|---|---|
| 2021/0049455 | A1 | 2/2021 | Kursun |
| 2021/0049456 | A1 | 2/2021 | Kursun |
| 2021/0049548 | A1 | 2/2021 | Grisz et al. |
| 2021/0049700 | A1 | 2/2021 | Nguyen et al. |
| 2021/0056114 | A1 | 2/2021 | Price et al. |
| 2021/0056306 | A1 | 2/2021 | Hu et al. |
| 2021/0056317 | A1 | 2/2021 | Golov |
| 2021/0056420 | A1 | 2/2021 | Konishi et al. |
| 2021/0056701 | A1 | 2/2021 | Vranceanu et al. |

FOREIGN PATENT DOCUMENTS

| | | | |
|---|---|---|---|
| CN | 102737236 | A | 10/2012 |
| CN | 103366339 | A | 10/2013 |
| CN | 104835114 | A | 8/2015 |
| CN | 103236037 | B | 5/2016 |
| CN | 103500322 | B | 8/2016 |
| CN | 106419893 | A | 2/2017 |
| CN | 106504253 | A | 3/2017 |
| CN | 107031600 | A | 8/2017 |
| CN | 107169421 | A | 9/2017 |
| CN | 107507134 | A | 12/2017 |
| CN | 107885214 | A | 4/2018 |
| CN | 108122234 | A | 6/2018 |
| CN | 107133943 | B | 7/2018 |
| CN | 107368926 | B | 7/2018 |
| CN | 105318888 | B | 8/2018 |
| CN | 108491889 | A | 9/2018 |
| CN | 108647591 | A | 10/2018 |
| CN | 108710865 | A | 10/2018 |
| CN | 105550701 | B | 11/2018 |
| CN | 108764185 | A | 11/2018 |
| CN | 108845574 | A | 11/2018 |
| CN | 108898177 | A | 11/2018 |
| CN | 109086867 | A | 12/2018 |
| CN | 107103113 | B | 1/2019 |
| CN | 109215067 | A | 1/2019 |
| CN | 109359731 | A | 2/2019 |
| CN | 109389207 | A | 2/2019 |
| CN | 109389552 | A | 2/2019 |
| CN | 106779060 | B | 3/2019 |
| CN | 109579856 | A | 4/2019 |
| CN | 109615073 | A | 4/2019 |
| CN | 106156754 | B | 5/2019 |
| CN | 106598226 | B | 5/2019 |
| CN | 106650922 | B | 5/2019 |
| CN | 109791626 | A | 5/2019 |
| CN | 109901595 | A | 6/2019 |
| CN | 109902732 | A | 6/2019 |
| CN | 109934163 | A | 6/2019 |
| CN | 109948428 | A | 6/2019 |
| CN | 109949257 | A | 6/2019 |
| CN | 109951710 | A | 6/2019 |
| CN | 109975308 | A | 7/2019 |
| CN | 109978132 | A | 7/2019 |
| CN | 109978161 | A | 7/2019 |
| CN | 110060202 | A | 7/2019 |
| CN | 110069071 | A | 7/2019 |
| CN | 110084086 | A | 8/2019 |
| CN | 110096937 | A | 8/2019 |
| CN | 110111340 | A | 8/2019 |
| CN | 110135485 | A | 8/2019 |
| CN | 110197270 | B | 9/2019 |
| CN | 110310264 | A | 10/2019 |
| CN | 110321965 | A | 10/2019 |
| CN | 110334801 | A | 10/2019 |
| CN | 110399875 | A | 11/2019 |
| CN | 110414362 | A | 11/2019 |
| CN | 110426051 | A | 11/2019 |
| CN | 110473173 | A | 11/2019 |
| CN | 110516665 | A | 11/2019 |
| CN | 110543837 | A | 12/2019 |
| CN | 110569899 | A | 12/2019 |
| CN | 110599537 | A | 12/2019 |
| CN | 110599864 | A | 12/2019 |
| CN | 110619282 | A | 12/2019 |
| CN | 110619283 | A | 12/2019 |
| CN | 110619330 | A | 12/2019 |
| CN | 110659628 | A | 1/2020 |
| CN | 110688992 | A | 1/2020 |
| CN | 107742311 | B | 2/2020 |
| CN | 110751280 | A | 2/2020 |
| CN | 110826566 | A | 2/2020 |
| CN | 107451659 | B | 4/2020 |
| CN | 108111873 | B | 4/2020 |
| CN | 110956185 | A | 4/2020 |
| CN | 110966991 | A | 4/2020 |
| CN | 111027549 | A | 4/2020 |
| CN | 111027575 | A | 4/2020 |
| CN | 111047225 | A | 4/2020 |
| CN | 111126453 | A | 5/2020 |
| CN | 111158355 | A | 5/2020 |
| CN | 107729998 | B | 6/2020 |
| CN | 108549934 | B | 6/2020 |
| CN | 111275129 | A | 6/2020 |
| CN | 111275618 | A | 6/2020 |
| CN | 111307162 | B | 6/2020 |
| CN | 111326023 | A | 6/2020 |
| CN | 111428943 | A | 7/2020 |
| CN | 111444821 | A | 7/2020 |
| CN | 111445420 | A | 7/2020 |
| CN | 111461052 | A | 7/2020 |
| CN | 111461053 | A | 7/2020 |
| CN | 111461110 | A | 7/2020 |
| CN | 110225341 | B | 8/2020 |
| CN | 111488770 | A | 8/2020 |
| CN | 111539514 | A | 8/2020 |
| CN | 111565318 | A | 8/2020 |
| CN | 111582216 | A | 8/2020 |
| CN | 111598095 | A | 8/2020 |
| CN | 108229526 | B | 9/2020 |
| CN | 111693972 | A | 9/2020 |
| CN | 106558058 | B | 10/2020 |
| CN | 107169560 | B | 10/2020 |
| CN | 107622258 | B | 10/2020 |
| CN | 111767801 | A | 10/2020 |
| CN | 111768002 | A | 10/2020 |
| CN | 111783545 | A | 10/2020 |
| CN | 111783971 | A | 10/2020 |
| CN | 111797657 | A | 10/2020 |
| CN | 111814623 | A | 10/2020 |
| CN | 111814902 | A | 10/2020 |
| CN | 111860499 | A | 10/2020 |
| CN | 111881856 | A | 11/2020 |
| CN | 111882579 | A | 11/2020 |
| CN | 111897639 | A | 11/2020 |
| CN | 111898507 | A | 11/2020 |
| CN | 111898523 | A | 11/2020 |
| CN | 111899227 | A | 11/2020 |
| CN | 112101175 | A | 12/2020 |
| CN | 112101562 | A | 12/2020 |
| CN | 112115953 | A | 12/2020 |
| CN | 111062973 | B | 1/2021 |
| CN | 111275080 | B | 1/2021 |
| CN | 112183739 | A | 1/2021 |
| CN | 112232497 | A | 1/2021 |
| CN | 112288658 | A | 1/2021 |
| CN | 112308095 | A | 2/2021 |
| CN | 112308799 | A | 2/2021 |
| CN | 112313663 | A | 2/2021 |
| CN | 112329552 | A | 2/2021 |
| CN | 112348783 | A | 2/2021 |
| CN | 111899245 | B | 3/2021 |
| DE | 20 2017 102 235 | U1 | 5/2017 |
| DE | 20 2017 102 238 | U1 | 5/2017 |
| DE | 10 2017 116 017 | A1 | 1/2019 |
| DE | 10 2018 130 821 | A1 | 6/2020 |
| DE | 10 2019 008 316 | A1 | 8/2020 |
| EP | 1 215 626 | B1 | 9/2008 |
| EP | 2 228 666 | B1 | 9/2012 |
| EP | 2 420 408 | B1 | 5/2013 |
| EP | 2 723 069 | A1 | 4/2014 |
| EP | 2 741 253 | A1 | 6/2014 |
| EP | 3 115 772 | A1 | 1/2017 |

(56)                References Cited

FOREIGN PATENT DOCUMENTS

| | | | |
|---|---|---|---|
| EP | 2 618 559 | B1 | 8/2017 |
| EP | 3 285 485 | A1 | 2/2018 |
| EP | 2 863 633 | B1 | 2/2019 |
| EP | 3 113 080 | B1 | 5/2019 |
| EP | 3 525 132 | A1 | 8/2019 |
| EP | 3 531 689 | A1 | 8/2019 |
| EP | 3 537 340 | A1 | 9/2019 |
| EP | 3 543 917 | A1 | 9/2019 |
| EP | 3 608 840 | A1 | 2/2020 |
| EP | 3 657 387 | A1 | 5/2020 |
| EP | 2 396 750 | B1 | 6/2020 |
| EP | 3 664 020 | A1 | 6/2020 |
| EP | 3 690 712 | A1 | 8/2020 |
| EP | 3 690 730 | A2 | 8/2020 |
| EP | 3 690 742 | A1 | 8/2020 |
| EP | 3 722 992 | A1 | 10/2020 |
| EP | 3 739 486 | A1 | 11/2020 |
| EP | 3 501 897 | B1 | 12/2020 |
| EP | 3 751 455 | A2 | 12/2020 |
| EP | 3 783 527 | A1 | 2/2021 |
| GB | 2 402 572 | B | 8/2005 |
| GB | 2 548 087 | A | 9/2017 |
| GB | 2 577 485 | A | 4/2020 |
| GB | 2 517 270 | B | 6/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015-004922 | A | 1/2015 |
| JP | 5863536 | B2 | 2/2016 |
| JP | 6044134 | B2 | 12/2016 |
| JP | 2019-101535 | A | 6/2019 |
| JP | 6525707 | B2 | 6/2019 |
| JP | 2020-101927 | A | 7/2020 |
| JP | 2020-173744 | A | 10/2020 |
| KR | 100326702 | B1 | 3/2002 |
| KR | 101082878 | B1 | 11/2011 |
| KR | 101738422 | B1 | 5/2017 |
| KR | 101969864 | B1 | 4/2019 |
| KR | 101996167 | B1 | 7/2019 |
| KR | 102022388 | B1 | 9/2019 |
| KR | 102043143 | B1 | 11/2019 |
| KR | 102095335 | B1 | 3/2020 |
| KR | 102097120 | B1 | 4/2020 |
| KR | 1020200085490 | A | 7/2020 |
| KR | 102189262 | B1 | 12/2020 |
| KR | 1020200142266 | A | 12/2020 |
| TW | 200630819 | A | 9/2006 |
| TW | I294089 | B | 3/2008 |
| TW | I306207 | B | 2/2009 |
| WO | WO-02/052835 | A2 | 7/2002 |
| WO | WO-2016/032398 | A2 | 3/2016 |
| WO | WO-2016/048108 | A1 | 3/2016 |
| WO | WO-2016/207875 | A1 | 12/2016 |
| WO | WO-2017/095580 | A1 | 6/2017 |
| WO | WO-2017/158622 | A2 | 9/2017 |
| WO | WO-2019/005547 | A1 | 1/2019 |
| WO | WO-2019/067695 | A1 | 4/2019 |
| WO | WO-2019/089339 | A1 | 5/2019 |
| WO | WO-2019/092456 | A1 | 5/2019 |
| WO | WO-2019/099622 | A1 | 5/2019 |
| WO | WO-2019/122952 | A1 | 6/2019 |
| WO | WO-2019/125191 | A1 | 6/2019 |
| WO | WO-2019/126755 | A1 | 6/2019 |
| WO | WO-2019/144575 | A1 | 8/2019 |
| WO | WO-2019/182782 | A1 | 9/2019 |
| WO | WO-2019/191578 | A1 | 10/2019 |
| WO | WO-2019/216938 | A1 | 11/2019 |
| WO | WO-2019/220436 | A2 | 11/2019 |
| WO | WO-2020/006154 | A2 | 1/2020 |
| WO | WO-2020/012756 | A1 | 1/2020 |
| WO | WO-2020/025696 | A1 | 2/2020 |
| WO | WO-2020/034663 | A1 | 2/2020 |
| WO | WO-2020/056157 | A1 | 3/2020 |
| WO | WO-2020/076356 | A1 | 4/2020 |
| WO | WO-2020/097221 | A1 | 5/2020 |
| WO | WO-2020/101246 | A1 | 5/2020 |
| WO | WO-2020/120050 | A1 | 6/2020 |
| WO | WO-2020/121973 | A1 | 6/2020 |
| WO | WO-2020/131140 | A1 | 6/2020 |
| WO | WO-2020/139181 | A1 | 7/2020 |
| WO | WO-2020/139355 | A1 | 7/2020 |
| WO | WO-2020/139357 | A1 | 7/2020 |
| WO | WO-2020/142193 | A1 | 7/2020 |
| WO | WO-2020/146445 | A1 | 7/2020 |
| WO | WO-2020/151329 | A1 | 7/2020 |
| WO | WO-2020/157761 | A1 | 8/2020 |
| WO | WO-2020/163455 | A1 | 8/2020 |
| WO | WO-2020/167667 | A1 | 8/2020 |
| WO | WO-2020/174262 | A1 | 9/2020 |
| WO | WO-2020/177583 | A1 | 9/2020 |
| WO | WO-2020/185233 | A1 | 9/2020 |
| WO | WO-2020/185234 | A1 | 9/2020 |
| WO | WO-2020/195658 | A1 | 10/2020 |
| WO | WO-2020/198189 | A1 | 10/2020 |
| WO | WO-2020/198779 | A1 | 10/2020 |
| WO | WO-2020/205597 | A1 | 10/2020 |
| WO | WO-2020/221200 | A1 | 11/2020 |
| WO | WO-2020/240284 | A2 | 12/2020 |
| WO | WO-2020/260020 | A1 | 12/2020 |
| WO | WO-2020/264010 | A1 | 12/2020 |

OTHER PUBLICATIONS

Wang, Yan, Rongrong Ji, and Shih-Fu Chang. "Label propagation from imagenet to 3d point clouds." Proceedings of the IEEE conference on computer vision and pattern recognition. 2013. (Year: 2013).*

Boulch, Alexandre, et al. "SnapNet: 3D point cloud semantic labeling with 2D deep segmentation networks." Computers & Graphics 71 (2017): 189-198. (Year: 2017).*

* cited by examiner

3D Point Cloud

250

214

258

254

210

Viewpoint

2D Camera Image

210

214

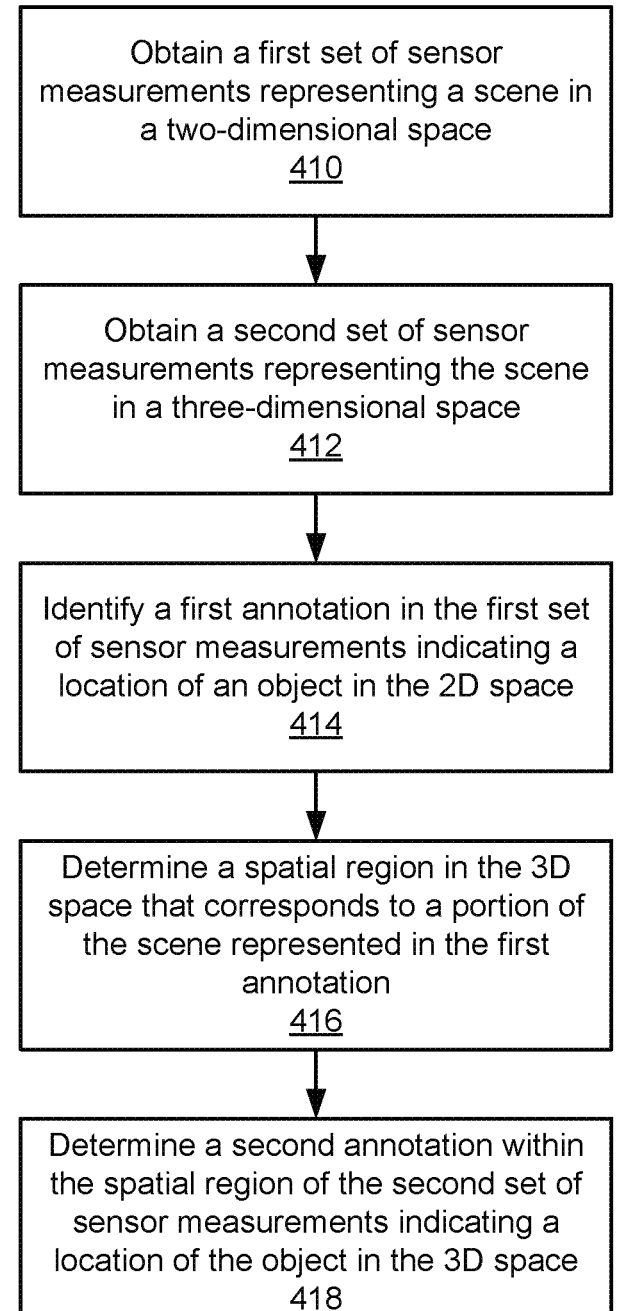

Obtain a first set of sensor measurements representing a scene in a two-dimensional space
410

Obtain a second set of sensor measurements representing the scene in a three-dimensional space
412

Identify a first annotation in the first set of sensor measurements indicating a location of an object in the 2D space
414

Determine a spatial region in the 3D space that corresponds to a portion of the scene represented in the first annotation
416

Determine a second annotation within the spatial region of the second set of sensor measurements indicating a location of the object in the 3D space
418

FIG. 4

ANNOTATION CROSS-LABELING FOR AUTONOMOUS CONTROL SYSTEMS

CROSS-REFERENCE TO RELATED APPLICATIONS

This application is a continuation of U.S. patent application Ser. No. 17/806,358, filed Jun. 10, 2022, which is a continuation of U.S. patent application Ser. No. 16/514,721, now U.S. Pat. No. 11,361,457, filed Jul. 17, 2019, which claims the benefit of U.S. Provisional Patent Application Ser. No. 62/701,441, filed Jul. 20, 2018, all of which are incorporated by reference herein in their entirety.

BACKGROUND

This invention relates generally to autonomous control systems, and more particularly to training computer models for autonomous control systems.

Autonomous control systems are systems that guide vehicles (e.g., automobiles, trucks, vans) without direct guidance by human operators. Autonomous control systems analyze the surrounding physical environment in various ways to guide vehicles in a safe manner. For example, an autonomous control system may detect and/or track objects in the physical environment, and responsive to a detected object, guide the vehicle away from the object such that collision with the object can be avoided. As another example, an autonomous control system may detect boundaries of lanes on the road such that the vehicle can be guided within the appropriate lane with the flow of traffic. Typically, the autonomous control system includes sensors that capture the surrounding environment as a set of sensor measurements in the form of images, videos, point cloud data, and the like.

Often times, autonomous control systems use computer models to analyze the surrounding environment and perform detection and control operations. The computer models are trained using training data that resemble potential environments the autonomous control system would encounter during operation. The training data may correspond to the type of sensor data generated by the sensors of the autonomous control system. In preparation for the training process, portions of the training data are annotated to label various objects of interest. Computer models can learn representations of the objects through these annotations. For example, annotations for an image of a street from a camera may be regions of the image containing pedestrians that computer models can be trained on to learn representations of people on the street.

Typically, annotations for training data can be generated by human operators who manually label the regions of interest, or can also be generated by annotation models that allow human operators to simply verify the annotations and relabel only those that are inaccurate. While fairly accurate labels can be easily and conveniently generated for certain types of sensor measurements, other types of sensor measurements can be difficult to annotate due to the format, size, or complexity of the data. For example, light detection and ranging (LIDAR) sensors generate sensor measurements in three-dimensional (3D) space that can be difficult for human operators to label compared to a two-dimensional (2D) image. In addition, although annotation models can be used to generate the annotations, this can also be difficult due to the significant amount of data that needs to be processed and the missing sensor measurements that result from the particular sensing mechanism.

SUMMARY

An annotation system uses annotations for a first set of sensor measurements from a first sensor to identify annotations for a second set of sensor measurements from a second sensor. Annotations for the first set of sensor measurements may be generated relatively easily and conveniently, while annotations for the second set of sensor measurements may be more difficult to generate than the first set of sensor measurements due to the sensing characteristics of the second sensor. In one embodiment, the first set of sensor measurements are from a camera that represent a scene in a two-dimensional (2D) space, and the second set of sensor measurements are from an active sensor, such as a light detection and ranging (LIDAR) sensor, that represent the scene in a three-dimensional space (3D).

Specifically, the annotation system identifies reference annotations in the first set of sensor measurements that indicates a location of a characteristic object in the 2D space. The annotation system determines a spatial region in the 3D space of the second set of sensor measurements that corresponds to a portion of the scene represented in the annotation of the first set of sensor measurements. The spatial region is determined using at least a viewpoint of the first sensor and the location of the first annotation in the 2D space. In one embodiment, the spatial region is represented as a viewing frustum, which is a pyramid of vision containing the region of space that may appear in the reference annotation in the 2D image. In one instance, the spatial region may be shaped as a rectangular pyramid.

The annotation system determines annotations within the spatial region of the second set of sensor measurements that indicates a location of the characteristic object in the 3D space. In one embodiment, the annotation system filters the spatial region from the second set of sensor measurements, and applies an annotation model to only the filtered region to determine the annotation for the second set of sensor measurements. The annotation system provides the annotations to human operators, such that they can be verified and relabeled if needed.

By using the annotation for the first set of sensor measurements to help determine the annotation for the second set of sensor measurements, the annotation system can narrow down on a spatial region that contains the characteristic object in the second set of sensor measurements in an efficient manner. For example, when the annotation model is applied to the entire second set of sensor measurements, an incorrect annotation outside the spatial region can potentially be assigned the highest likelihood that the region encompassed by the annotation contains the characteristic object. Since the annotation model is restricted to searching a smaller space that actually contains the characteristic object, there is a higher chance the annotation model will identify the appropriate annotation for the object without the need to search the entire space of the second set of sensor measurements. This way, the annotation system can improve the accuracy of annotations as well as save computational resources compared to applying the annotation model to the entire second set of sensor measurements.

BRIEF DESCRIPTION OF THE DRAWINGS

FIG. 4 is a flowchart illustrating a process of determining an annotation for a second set of sensor measurements using an annotation from a first set of sensor measurements, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
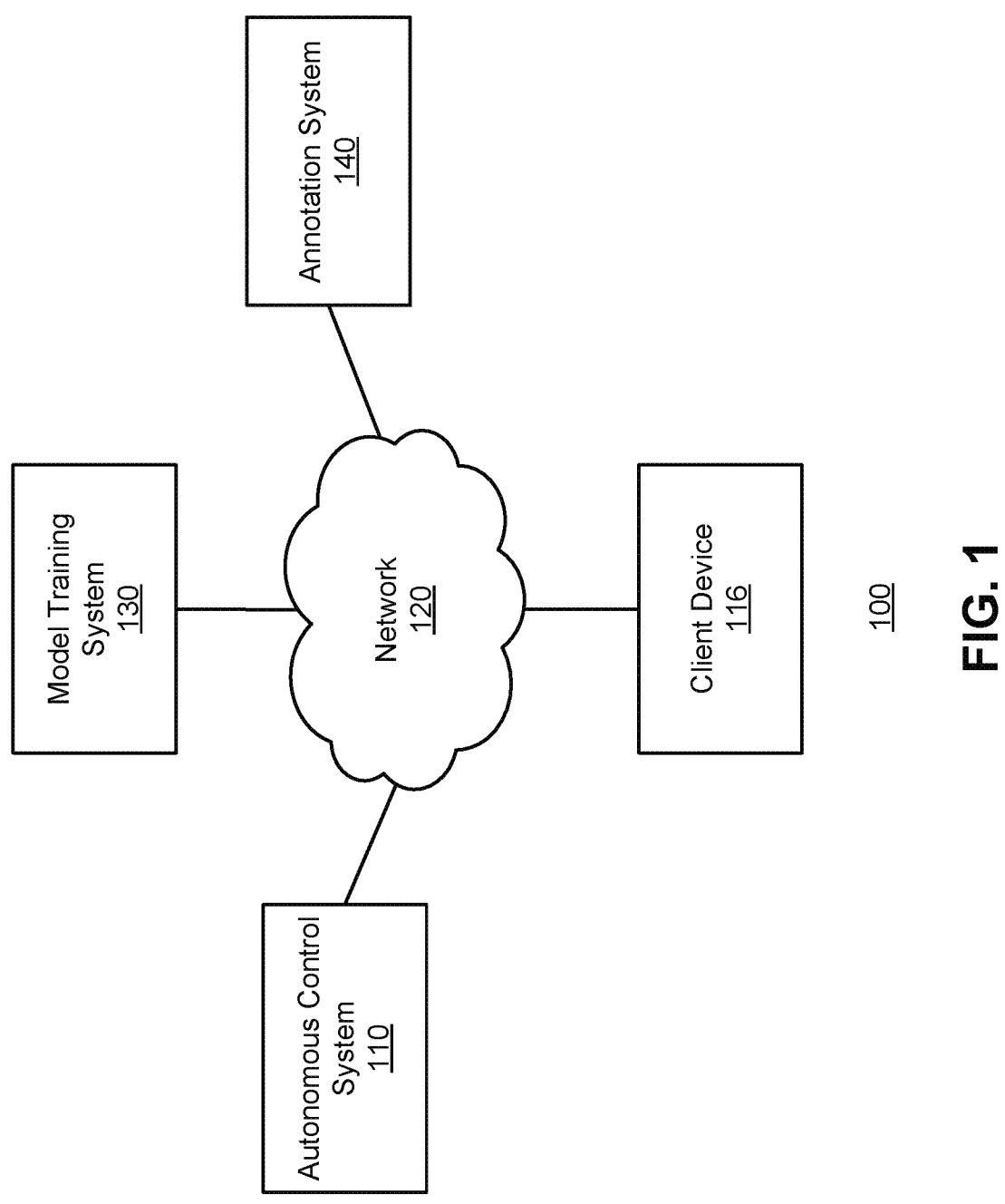
FIG. 1 is an example network environment for an annotation system, according to an embodiment.

FIG. 1 is an example network environment 100 for an annotation system 140, according to an embodiment. The network environment 100 includes an autonomous control system 110, a model training system 130, an annotation system 140, and one or more client devices 116 coupled to a network 120.

The autonomous control system 110 guides vehicles based on information related to the surrounding environment received from the one or more sensors attached to the vehicles. The vehicles are any means of conveyance or transport in or by which someone or something can travel from one place to another, and may include automobiles, trucks, vans, robotic transports, and the like. The autonomous control system 110 may guide a vehicle through one or more trips from one destination to another. For example, the autonomous control system 110 may guide a ride-sharing vehicle (e.g., a taxi) from a passenger's point of pick-up to their desired destination.

The autonomous control system 110 performs various detection and control algorithms based on sensor data to guide the vehicles in a safe and efficient manner. For example, the autonomous control system 110 may detect various objects (e.g., lamp post, cars) that are proximate to a vehicle in the captured sensor data of the environment, and guide the vehicle away from the objects to prevent collision of the vehicle with the objects. As another example, the autonomous control system 110 may detect boundaries of lanes on the road such that the vehicle can be guided within the appropriate lane with the flow of traffic. Other examples also include simulating sensor data, estimating sensor quality, and the like.

One or more sensors are attached to the vehicles to gather information used to generate the control of the vehicle. The sensors are devices that detect information related to the environment, and generate sensor measurements that characterize how the sensor perceives the environment. The information can be captured through many forms.

More generally, the autonomous control system 110 may include passive sensors or active sensors. Passive sensors include a receiver that detects and measures various forms of energy that are naturally emitted from the physical environment or constituents of the physical environment across various locations. In one instance, the passive sensors include a camera that generates a two-dimensional (2D) image of pixel data indicating intensities of detected light as sensor measurements. In another instance, the passive sensors include a microphone that generates a time series of air pressure values. In another instance, the passive sensors include a vibration sensor that generates a time series of physical displacements of the vibration sensor.

Active sensors emit energy and measure the energy that is reflected back to one or more receivers of the sensor. The reflected energy allows active sensors to probe for environmental information that may not otherwise be readily detected passively at the sensor. This may allow active sensors to represent the environment across a higher dimension compared to passive sensors. For example, active sensors may be capable of estimating distances of objects, and may represent the environment in a three-dimensional (3D) space rather than the 2D space of an image from a camera. Due to their sensing mechanism, active sensors may also output sparse sensor measurements that contain missing portions of data when, for example, objects are outside the sensing range of the sensor or in the presence of occlusions such as rain, fog, and snow.

In one instance, the active sensors include ultrasound sensors that emit ultrasound waves, radio detection and ranging (RADAR) sensors that emit microwaves, light detection and ranging (LIDAR) sensors that emit laser pulses in the near-IR or visible range waves, and IR sensors that emit IR waves. In particular, the sensor measurements of active sensors may include intensity and reflectance measurements of the reflected energy sensed at the receiver. The sensor measurements can be used to generate a depth map indicating how far away objects are from the sensor, or generate a point cloud that represents the environment with reference to a 3D coordinate system, such as a Cartesian coordinate system or a spherical coordinate system. Each value in the point cloud designates the measurements of the actively-transmitted signal as received back at the receiver (e.g., depth or reflected intensity measurements).

In one embodiment, various functions of the autonomous control system 110 are performed through machine-learned computer models. The computer models may be configured to receive the sensor measurements and generate desired output data that is of interest to the autonomous control system 110. For example, a computer detection model may identify regions of a 3D LIDAR point cloud that contains pedestrians, vehicles, and other objects of interest, such that the vehicle can be guided away from these objects to prevent collision. In one embodiment, the machine-learned models are neural network models such as feed-forward networks, convolutional neural networks (CNN), deep neural networks (DNN), recurrent neural networks (RNN), self-organizing maps (SOM), and the like, that are trained by the model training system 130 based on training data.

Though described herein as an autonomous vehicle, the control decisions of the autonomous control system 110 may provide semi-autonomous control rather than complete control of the vehicle, for example to supplement or override user control, or as primary means of control that can be overridden by a user. In addition, although the autonomous control system 110 is described herein as a system that guides vehicles, the autonomous control system 110 may also guide other systems such as robotic arms or manufacturing equipment.

The model training system 130 trains machine-learned computer models for use in the autonomous control system 110. The computer models are trained using training data, which are known sensor measurements that resemble sensing of potential environments the autonomous control system 110 would encounter during operation. The training data may correspond to the type of sensor measurements generated by sensors of the autonomous control system 110. For example, the training data may include images from cameras that represent various scenes in 2D space, and point cloud measurements from active sensors such as LIDAR sensors, RADAR sensors, and the like that represent the scenes in 3D space.

In one embodiment, portions of the training data are annotated by the annotation system 140 with labels indicating various objects of interest, such as pedestrians, vehicles, and the like. The computer models can learn to detect the objects through these annotations. For example, annotations for a training data set of LIDAR sensor measurements may include 3D bounding boxes around vehicles that can be used to train computer models to predict bounding boxes containing the characteristic objects for a new set of LIDAR sensor measurements. The model training system 130 receives annotated training data from the annotation system 140.

The annotation system 140 provides annotated training data to the model training system 130. The annotations represent a desired type of metadata that correspond to the type of data the computer models are configured to predict. For example, annotated regions containing pedestrians can be used to train a computer model that outputs likelihoods that a region of an image contains a pedestrian. In one instance, the annotations are in the form of bounding boxes that enclose objects of interest, preferably within the smallest area or volume possible. In another instance, the annotations are in the form of labels that partition an image into different segments. A pixel or groups of pixels in the image may be assigned a label such that pixels with the same labels share certain characteristics.

In one instance, the annotation system 140 obtains annotations in conjunction with human operators who manually label regions of interest through, for example, an interface provided by the annotation system 140. In another instance, the annotation system 140 automatically generates estimated annotations by applying an annotation model to the training data. Typically, the annotation model scans portions of the sensor measurements in an incremental fashion, and assigns likelihoods to a set of estimated annotations that indicate likelihoods of containing the object of interest. For example, the annotation model may sequentially scan portions of sensor measurements defined by a rectangular bounding box across a particular direction (e.g., width) of the sensor measurements, and assign a likelihood to each portion that indicate a likelihood the portion contains the object of interest. The estimations with the highest likelihoods are usually designated as the annotations for the training data. For example, the bounding boxes with likelihoods above a threshold amount may be designated as annotations for the training data. The annotation system 140 provides the annotations to human operators that verify the result and relabel those that are inaccurate.

While fairly accurate labels can be easily and conveniently generated for certain types of sensor measurements, other types of sensor measurements can be difficult to annotate due to the format, size, or complexity of the data. For example, high-quality annotations for a 2D camera image may be generated fairly easily using widely established annotation tools and models, while sensor measurements for active sensors, such as LIDAR sensors, may require annotations in the 3D space that can be more difficult for human operators to label. Although annotation models can also be used to generate the annotations, this may require scanning the entire set of sensor measurements in the 3D space that can be computationally burdensome. In addition, the annotations may have suboptimal accuracy due to the missing data points that result from the active sensing mechanism.

Thus, in one embodiment, the annotation system 140 uses annotations for a first set of sensor measurements from a first sensor to identify annotations for a second set of sensor measurements from a second sensor. Often times, the training data contains multiple sensor measurements that correspond to the same scene. For example, the training data may have been obtained from multiple sensors attached to a data collection vehicle. The data collection sensors may have the same or different viewpoints. The annotation system 140 takes advantage of the annotations for a first set of sensor measurements to determine annotations for a second set of sensor measurements that capture the same scene. Annotations for the first set of sensor measurements may be generated relatively easily and conveniently, while annotations for the second set of sensor measurements may be more difficult to generate than the first set of sensor measurements due to the sensing characteristics of the second sensor.

Specifically, the annotation system 140 identifies reference annotations in the first set of sensor measurements that indicates a location of a characteristic object in the 2D space. The annotation system 140 determines a spatial region in the 3D space of the second set of sensor measurements that corresponds to a portion of the scene represented in the annotation of the first set of sensor measurements. The spatial region is determined using at least a viewpoint of the first sensor and the location of the annotation in the first set of sensor measurements. In one embodiment, the spatial region is represented as a viewing frustum, which is a pyramid of vision containing the region of space that may appear in the reference annotation in the 2D image. In one instance, the frustum may be shaped as a rectangular pyramid.

The annotation system 140 determines annotations within the spatial region of the second set of sensor measurements that indicates a location of the characteristic object in the 3D space. In one embodiment, the annotation system 140 filters the spatial region from the second set of sensor measurements, and applies an annotation model to only the filtered region to determine the annotations for the second set of sensor measurements. The annotation system 140 provides the annotations to client devices 116 associated with human operators, such that the annotations can be verified and relabeled if needed.

By using the annotation for the first set of sensor measurements to help determine the annotation for the second set of sensor measurements, the annotation system 140 can quickly narrow down on a spatial region that contains the characteristic object. For example, when the annotation model is applied to the entire second set of sensor measurements, an incorrect annotation outside the spatial region can potentially be assigned the highest likelihood, and thus, be designated as an annotation even though the region may not contain the characteristic object. Since the annotation model is restricted to searching a smaller space that contains the characteristic object, there is a higher chance the annotation model will identify the appropriate annotation for the object. This way, the annotation system 140 can improve the accuracy of annotations as well as save computational resources compared to applying the annotation model to the entire second set of sensor measurements.

In one particular embodiment referred to throughout the remainder of the specification, the first set of sensor measurements are sensor measurements from a camera that represent a scene as a two-dimensional (2D) image, and the second set of sensor measurements are sensor measurements from a LIDAR sensor that represent the scene in a three-dimensional space (3D). However, it is appreciated that in other embodiments, the first set of sensors and the second set of sensors can be any other type of sensor measurements that capture the same scene, in which the portion of the scene labeled in the annotation of the first set of sensor measurements can be extrapolated to a region of space in the second set of sensor measurements that contain the portion of the scene.

Figure 2:
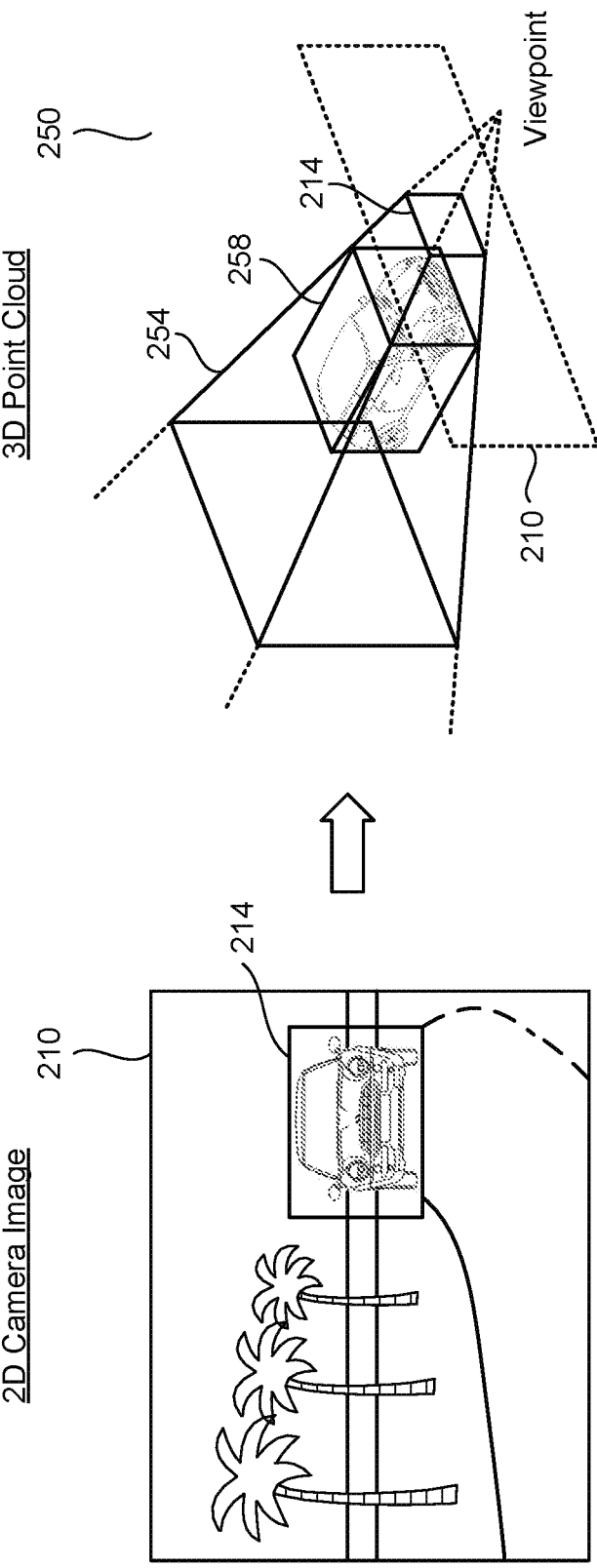
FIG. 2 illustrates an example process of using an annotation for a first set of sensor measurements to identify a 3D spatial region and an annotation for a second set of sensor measurements, according to an embodiment.

FIG. 2 illustrates an example process of using an annotation for a first set of sensor measurements to identify a 3D spatial region and an annotation for a second set of sensor measurements, according to an embodiment. The example shown in FIG. 2 illustrates a 2D camera image 210 of a vehicle on a road, and a 3D LIDAR point cloud 250 of the scene. Specifically, the image 210 is a projection of the scene from a particular viewpoint of the camera. The annotation system 140 obtains a bounding box 214 around the vehicle of interest. The bounding box 214 may be manually drawn by a human operator or identified through an annotation model. The annotation system 140 identifies a frustum 254 shaped as a rectangular pyramid in the 3D LIDAR point cloud 250 that corresponds to a portion of the scene contained in the bounding box 214. The annotation system 140 applies an annotation model to the sensor measurements of the frustum 254 to identify a 3D bounding box 258 around the vehicle of interest.

Although FIG. 2 shows bounding boxes as annotations for ease of illustration, it is appreciated that other types of annotations can be used as described in conjunction with FIG. 1. For example, the annotations for the first and second set of sensor measurements may be segmentation labels indicating pedestrians. As another example, the annotations between the first and second set of sensor measurements may also correspond to different types of labels. For example, the annotations for the first set of sensor measurements may be segmentation labels, while the annotations for the second set of sensor measurements may be 3D bounding boxes.

Returning to FIG. 1, the client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the annotation system 140. For example, a client device 116 executes a browser application to enable interaction between the client device 116 and the annotation system 140 via the network 120. In another embodiment, the client device 116 interacts with the annotation system 140 through an application programming interface (API) running on a native operating system of the client device 116, such as IOS® or ANDROID™.

The client devices 116 are associated with human operators that provide various forms of guidance to the annotation system 140 annotations for training data. In one embodiment, the human operators interact with interfaces generated by the annotation system 140 via the client devices 116 to provide guidance on annotations. For example, a human operator may interact with the interface using a browser application of the client device 116. In one embodiment, the client devices 116 receive annotations generated by the annotation system 140 and verifies the accuracy of the annotations. If the annotations are inaccurate, the human operators may also choose to manually relabel the annotations through the interface, such that the annotation system 140 can receive the corrected annotation.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 3:
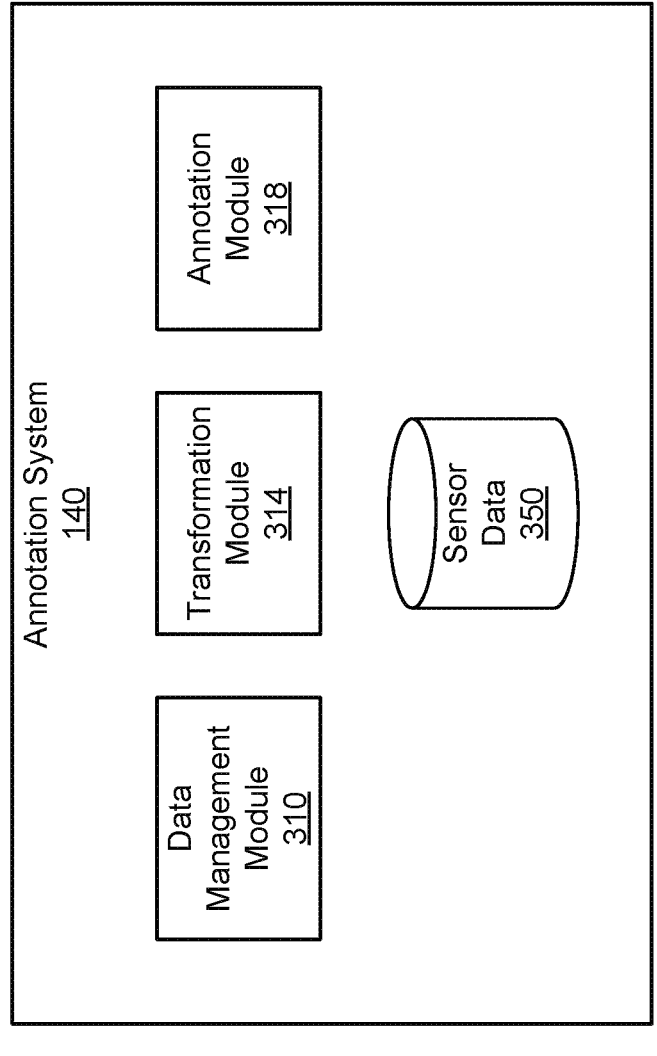
FIG. 3 is an example block diagram of an architecture of the annotation system, in accordance with an embodiment.

FIG. 3 is an example block diagram of an architecture of the annotation system 140, according to one embodiment. The annotation system 140 shown in FIG. 3 includes a data management module 310, a transformation module 314, and an annotation module 318. The annotation system 140 also includes a sensor data store 350. In alternative configurations, different or additional components may be included in the annotation system 140.

The data management module 310 manages the sensor data store 350. The sensor data store 350 includes sensor measurements in the form of images, videos, point clouds, and the like that the annotation system 140 can annotate. The annotated data can be provided to the model training system 130 as training data for training the computer models. The sensor measurements may be generated from physical sensors, may be simulated with respect to virtual sensors or may be a combination of both. In particular, the sensor data store 350 may include sensor measurements from different sensors that correspond to the same scene from the same or different viewpoints.

In one instance, the sensor data store 350 includes sensor measurements from a camera. The sensor measurements from the camera may be arranged as pixels and each pixel may have one or more intensity values associated with it depending on whether the camera is a grayscale or color camera. For example, when the camera is a color camera describing a color of a pixel in red, green, and blue, the intensity value for each is typically an integer, such as an 8, 10, or 12-bit integer specifying the intensity of the red, green, or blue portion of the frequency. If the resolution of the picture were 100×100 pixels (having 10,000 total pixels), for every image, there would be 3 separate channels of 10,000 pixels.

In one instance, the sensor data store 350 includes sensor measurements from an active sensor. The sensor measurements from the active sensor may represent the scene in 3D space. In particular, the sensor data store 350 may include sensor measurements from a LIDAR sensor. The active sensor measurements may sense a same scene captured by the camera images but from a same or different viewpoint from the camera. For example, the training data may include an image of a vehicle on a road captured by a color camera near the dashboard of a vehicle. The training data may also include a LIDAR point cloud of the vehicle on the road captured by a LIDAR sensor attached to the roof of the vehicle.

In one instance, the active sensor measurements are arranged as depth maps. The depth maps include depth measurements that indicate how far away an object in the environment is from the sensor. Specifically, the depth is measured by triggering a timer when the energy is emitted, and detecting the amount of time needed for the receiver to detect the reflected energy. The traveling speed of the energy can be used to calculate the depth of various objects at various locations in the environment by emitting energy signals in the direction of the objects. The depth maps may also include intensity measurements that indicate the intensity of the reflected energy detected at the receiver of the sensor. These intensity values may be represented as 8 or 16-bit integer values.

In another instance, the active sensor measurements are arranged as point clouds with reference to a 3D coordinate system, such as a Cartesian coordinate system or a spherical coordinate system. Each value in the point cloud designates the measurements of the actively-transmitted signal at the receiver (e.g., depth or reflected intensity measurements). The number of data points in the point cloud is related to the resolution of the sensor. Further, for a given sensor, the number of data points varies depending on factors such as what portion of the environment is within the sensor's range.

The transformation module 314 obtains reference annotations in a first set of sensor measurements and identifies a spatial region in a second set of sensor measurements that corresponds to a portion of the scene represented in the reference annotation. As discussed in conjunction with FIG. 1, the first set of sensor measurements may be generated by a camera and the second set of sensor measurements may be generated by a LIDAR sensor. In one embodiment, the transformation module 314 determines the reference annotation for the first set of sensor measurements by applying an annotation model to the data or in conjunction with a human operator who manually labels the data. In other embodiments, the first set of sensor measurements may already be labeled with the appropriate annotations.

The transformation module 314 determines a spatial region in the space of the second set of sensor measurements that corresponds to a portion of the scene captured in the reference annotations of the first set of sensor measurements. When the reference annotation is a bounding box, the portion of the scene may refer to the region contained within the bounding box. When the reference annotations are segmentation labels, the portion of the scene may refer to the region encompassed by the pixels labeled as the characteristic object. The transformation module 314 applies one or more geometric transformations to the annotated region of the first set of sensor measurements to determine the spatial region in the second set of measurements. In particular, when the spatial region is shaped as a viewing frustum, the transformation module 314 may determine the coordinates of the near plane and the far plane of the viewing frustum that contain the characteristic object in the second set of sensor measurements.

The annotation module 318 determines the annotations for the second set of sensor measurements based on the spatial region identified by the transformation module 314. In one embodiment, the annotation module 318 filters the subset of sensor measurements contained in the spatial region and applies an annotation model to only the filtered subset to determine the annotations. In one instance, the annotations output by the annotation model may be 3D bounding boxes that are volumetric rectangular prisms that surround the object of interest in the 3D space. In another instance, the annotations may be segmentation labels that indicate which measurements correspond to characteristic objects.

FIG. 4 is a flowchart illustrating a process of determining an annotation for a second set of sensor measurements using an annotation from a first set of sensor measurements, according to one embodiment. The annotation system obtains 410 a first set of sensor measurements representing a scene in a two-dimensional space with respect to a viewpoint of a first sensor capturing the scene. The annotation system obtains 412 a second set of sensor measurements representing the scene in a three-dimensional space captured by a second sensor. The annotation system identifies 414 a first annotation in the first set of sensor measurements that indicates a location of a characteristic object in the two-dimensional space. The annotation system determines 416 a spatial region in the three-dimensional space that corresponds to a portion of the scene represented in the first annotation. The spatial region is determined using at least the viewpoint of the first sensor and a location of the first annotation in the two-dimensional space. The annotation system determines 418 a second annotation within the spatial region of the second set of sensor measurements that indicates a location of the characteristic object in the three-dimensional space. The annotations for the second set of sensor measurements may be used to train a model for detecting characteristic objects in measurements generated by the type of sensor used to generate the second set of sensor measurements.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
obtaining, by a processor, an image of a real-world scene captured by a first sensor, wherein at least a portion of an object is represented by the image;
annotating, by the processor, a portion of the image with a first annotation, the first annotation indicating a location of the object in the image;
obtaining, by the processor, sensor measurements of the real-world scene captured by a second sensor, the sensor measurements representing the real-world scene in three-dimensional space;
determining, by the processor, a spatial region associated with the sensor measurements that at least partially corresponds with the portion of the image annotated with the first annotation;
searching, by the processor, within the spatial region to identify a portion of the spatial region that includes the object; and
annotating, by the processor, the sensor measurements with a second annotation, the second annotation indicating a location of the object in the portion of the spatial region.

2. The method of claim 1, wherein obtaining the sensor measurements captured by the second sensor comprises obtaining sensor measurements that are arranged as a point cloud that models the real-world scene with respect to a three-dimensional coordinate system.

3. The method of claim 1, wherein obtaining the sensor measurements captured by the second sensor comprises obtaining sensor measurements that are arranged as a depth map, the depth map comprising depth measurements that indicate distances to objects in the real-world scene from the first sensor.

4. The method of claim 1, wherein searching within the spatial region to identify the portion of the spatial region that includes the object comprises:

determining a filtered subset of sensor measurements contained in the spatial region, and applying an annotation model to the filtered subset of sensor measurements to identify the portion of the spatial region that includes the object.

5. The method of claim 1, further comprising:
generating training data based on the sensor measurements and the second annotation; and
training a computer model using the training data.

6. The method of claim 1, wherein obtaining the image of the real-world scene captured by the first sensor comprises obtaining the image from a camera, and
wherein obtaining the sensor measurements of the real-world scene captured by the second sensor comprises:
obtaining the sensor measurements from a light detection and ranging (LIDAR) sensor or a radio detection and ranging (RADAR) sensor.

7. The method of claim 1, wherein obtaining the image of the real-world scene captured by the first sensor comprises obtaining the image from a camera, and
wherein obtaining the sensor measurements of the real-world scene captured by the second sensor comprises:
obtaining the sensor measurements from an infrared (IR) sensor.

8. The method of claim 1, wherein obtaining the sensor measurements of the real-world scene captured by the second sensor comprises obtaining the sensor measurements of the real-world scene, where the sensor measurements are captured with respect to a viewpoint of the second sensor which is different from a viewpoint of the first sensor.

9. The method of claim 1, wherein annotating the sensor measurements with the second annotation comprises annotating the sensor measurements based on a bounding box that surrounds at least a portion of the object in the three-dimensional space.

10. The method of claim 1, wherein annotating the sensor measurements with the second annotation comprises assigning a label to a subset of the sensor measurements, the label identifying the object.

11. A system, comprising:
at least one computer processor for executing computer program instructions; and
a non-transitory computer-readable storage medium storing computer program instructions executable by the at least one computer processor to perform operations comprising:
obtaining an image of a real-world scene captured by a first sensor, wherein at least a portion of an object is represented by the image;
annotating a portion of the image with a first annotation, the first annotation indicating a location of the object in the image;
obtaining sensor measurements of the real-world scene captured by a second sensor, the sensor measurements representing the real-world scene in three-dimensional space;
determining a spatial region associated with the sensor measurements that at least partially corresponds with the portion of the image annotated with the first annotation;
searching within the spatial region to identify a portion of the spatial region that includes the object; and
annotating the sensor measurements with a second annotation, the second annotation indicating a location of the object in the portion of the spatial region.

12. The system of claim 11, wherein the instructions that cause the at least one computer processor to obtain the sensor measurements captured by the second sensor cause the at least one computer processor to obtain sensor measurements that are arranged as a point cloud that models the real-world scene with respect to a three-dimensional coordinate system.

13. The system of claim 11, wherein the instructions that cause the at least one computer processor to obtain the sensor measurements captured by the second sensor cause the at least one computer processor to obtain the sensor measurements, wherein the sensor measurements are arranged as a depth map, the depth map comprising depth measurements that indicate distances to objects in the real-world scene from the first sensor.

14. The system of claim 11, wherein the instructions that cause the at least one computer processor to search within the spatial region to identify the portion of the spatial region that includes the object cause the at least one computer processor to:

determine a filtered subset of sensor measurements contained in the spatial region; and apply an annotation model to the filtered subset of sensor measurements to identify the portion of the spatial region that includes the object.

15. The system of claim 11, wherein the instructions further cause the at least one computer processor to:

generate training data based on the sensor measurements and the second annotation; and train a computer model using the training data.

16. The system of claim 11, wherein the instructions that cause the at least one computer processor to obtain the image of the real-world scene captured by the first sensor cause the at least one computer processor to obtain the image from a camera, and wherein the instructions that cause the at least one computer processor to obtain the sensor measurements of the real-world scene captured by the second sensor cause the at least one computer processor to: obtain the sensor measurements from a light detection and ranging (LIDAR) sensor or a radio detection and ranging (RADAR) sensor.

17. The system of claim 11, wherein the instructions that cause the at least one computer processor to obtain the image of the real-world scene captured by the first sensor cause the at least one computer processor to obtain the image from a camera, and wherein the instructions that cause the at least one computer processor to obtain the sensor measurements of the real-world scene captured by the second sensor cause the at least one computer processor to obtain the sensor measurements from an infrared (IR) sensor.

18. The system of claim 11, wherein the instructions that cause the at least one computer processor to obtain the sensor measurements of the real-world scene captured by the second sensor cause the at least one computer processor to obtain the sensor measurements of the real-world scene, wherein the sensor measurements are captured with respect to a viewpoint of the second sensor which is different from a viewpoint of the first sensor.

19. The system of claim 11, wherein the instructions that cause the at least one computer processor to annotate the sensor measurements with the second annotation cause the at least one computer processor to annotate the sensor measurements based on a bounding box that surrounds at least a portion of the object in the three-dimensional space.

20. The system of claim 11, wherein the instructions that cause the at least one computer processor to annotate the sensor measurements with the second annotation cause the at least one computer processor to assign a label to a subset of the sensor measurements, the label identifying the object.

* * * * *